US008275714B2

(12) United States Patent
Eugenio

(10) Patent No.: US 8,275,714 B2
(45) Date of Patent: Sep. 25, 2012

(54) METHOD FOR PERFORMING A DIGITAL CASH TRANSACTION

(76) Inventor: Rafael A. Eugenio, Hercules, CA (US)

( * ) Notice: Subject to any disclaimer, the term of this patent is extended or adjusted under 35 U.S.C. 154(b) by 387 days.

(21) Appl. No.: 12/573,725

(22) Filed: Oct. 5, 2009

(65) Prior Publication Data

US 2010/0088231 A1  Apr. 8, 2010

Related U.S. Application Data

(60) Provisional application No. 61/102,848, filed on Oct. 5, 2008, provisional application No. 61/244,822, filed on Sep. 22, 2009.

(51) Int. Cl.
*G06Q 40/00* (2006.01)
*H04M 11/00* (2006.01)
(52) U.S. Cl. ............... 705/44; 705/39; 379/91.01
(58) Field of Classification Search ............... 705/44, 705/39, 76; 379/91.01; 382/100; 709/206
See application file for complete search history.

(56) References Cited

U.S. PATENT DOCUMENTS

| | | | | |
|---|---|---|---|---|
| 5,247,523 A | * | 9/1993 | Arai et al. | 714/755 |
| 5,511,121 A | * | 4/1996 | Yacobi | 705/69 |
| 6,157,920 A | * | 12/2000 | Jakobsson et al. | 705/69 |
| 6,393,411 B1 | * | 5/2002 | Bishop et al. | 705/44 |
| 6,418,326 B1 | * | 7/2002 | Heinonen et al. | 455/558 |
| 6,721,716 B1 | * | 4/2004 | Gross | 705/40 |
| 6,976,146 B1 | * | 12/2005 | Aiello et al. | 711/202 |
| 7,536,352 B2 | * | 5/2009 | Lapsley et al. | 705/44 |
| 7,630,939 B1 | * | 12/2009 | Kolls | 705/43 |
| 7,716,129 B1 | * | 5/2010 | Tan et al. | 705/40 |
| 7,756,785 B2 | * | 7/2010 | Gebb et al. | 705/39 |
| 2002/0004779 A1 | * | 1/2002 | Turk et al. | 705/39 |
| 2007/0168266 A1 | * | 7/2007 | Questembert | 705/35 |

OTHER PUBLICATIONS

Peter S. Gemmell; "Electronic Payments Traceable e-cash"; Feb. 1997; pp. 35-37.*
King, Seth S.; "(Continental Ill Natl Bank & Trust Co and First Natl Bank of Chicago are continuing to operate Customer Bank Communication Terminals (CBCT)"; Sunday, Feb. 15, 1976; p. 1.*
PR Newswire; "Mosaic Software's Postillion Prepay at Paypoint Used for Splash Plastic Pre-Pay Top-UPS in the UK"; Friday, May 11, 2001; pp. 1-2.*
Collections & Credit Risk, V 10, n 4; "New Image for Check Fraud Prevention: Check 21's intent may have been to streamline the way banks process checks, but it's paving the way for banks to make new uses of imaging technology to help combat check fraud"; Apr. 2005; pp. 1-3.*

(Continued)

*Primary Examiner* — Ella Colbert
(74) *Attorney, Agent, or Firm* — Lewis and Roca LLP

(57) ABSTRACT

A method for performing a digital monetary transaction between a payer and payee comprising the steps of receiving a digital-cash value requested to be withdrawn from an account of a payer; generating a digital-cash code that is associated with the requested digital-cash value and communicating the digital-cash code to the payer; receiving the digital-cash value and the digital-cash code from a payee requesting to deposit the amount specified by the digital-cash value; comparing the received digital-cash value and the digital-cash code to confirm an association; and transferring funds of the amount specified by the digital-cash value to the payee. A system including a central digital-cash system and a network interface preferably can preferably operate the method.

1 Claim, 4 Drawing Sheets

OTHER PUBLICATIONS

Bank Network News, v17, n2; "Two Giants Square Off in the Bill Pay Arena (US consumers used PCs and telephones to initiate only 1.6% of 18.7 bil recurring bills in 1997; CheckFree/Visa joint venture and MSFDC venture to compete with each other for electronic bill presentment/payment market)"; Jun. 9, 1998; pp. 1-3.*

Conrath, Chris; ComputerWorld Canada; "Breaking our fondness for cash: getting Canadians to adopt an e-money attitude no easy sell"; Nov. 29, 2002, vol. 18, Issue 24; pp. 1-2.*

Business/Technology Editors Cartes '99; Business Wire; "Digital Courier Teams Up With Mondex International to Develop Internet Payment Gateway; Digital Courier's New Gateway to Include Mondex Electronic Cash"; Nov. 17, 1999; pp. 1-3.*

PR Newswire; "Digital Courier Teams Up With Mondex International to Develop Internet Payment Gateway"; Nov. 16, 1999; pp. 1-3.*

Alan Crawford; The Scotsman; "Digital cash will register online profit / Helping peopls make small change transactions on the net will soon be a big deal, writes Alan Crawford; [Sup Edition]"; Feb. 25, 1998; pp. 1-3.*

A. Shukor Rahman: Possible effects of digital cash to the world economy; [Computimes, ,2* Edition]; Dec. 16, 1996; pp. 1-3.*

* cited by examiner

METHOD FOR PERFORMING A DIGITAL CASH TRANSACTION

CROSS-REFERENCE TO RELATED APPLICATIONS

This application claims the benefit of U.S. Provisional Application No. 61/102,848 filed 5 Oct. 2008 entitled "Its-LikeCash Digital Cash Electronic Payment Instrument and Platform using Telephones or Any Digital Communicating Device" and U.S. Provisional Application No. 61/244,822 filed 22 Sep. 2009 entitled "Method for Performing a Digital Cash Transaction", which are incorporated in their entirety by this reference.

TECHNICAL FIELD

This invention relates generally to the banking field and more specifically to a new and useful digital transaction in the banking field.

BACKGROUND

Digital cash (also known as electronic currency, electronic money, e-money, electronic cash, digital currency, or digital money) refers to money that is exchanged without a transfer of physical currency. Typically, this involves use of computer networks, the internet, and digital stored value systems. Electronic Funds Transfer (EFT) and direct deposit are examples of electronic money. While seen as an evolution to physical currency, most digital cash systems require sophisticated electronic devices such as smart phones or chip-enabled transaction cards. While these new systems may increase the convenience of the wealthy, they are beyond the financial and technological reach of the poor. The poor and inaccessible people of the world, which generally pay four to six times more for financial services, would not benefit from the new digital cash systems. Thus, there is a need in the banking field to create a new and useful method for performing digital cash transactions. This invention provides such a new and useful method.

DESCRIPTION OF THE PREFERRED EMBODIMENTS

The following description of the preferred embodiments of the invention is not intended to limit the invention to these embodiments, but rather to enable any person skilled in the art to make and use this invention.

Figure 1:
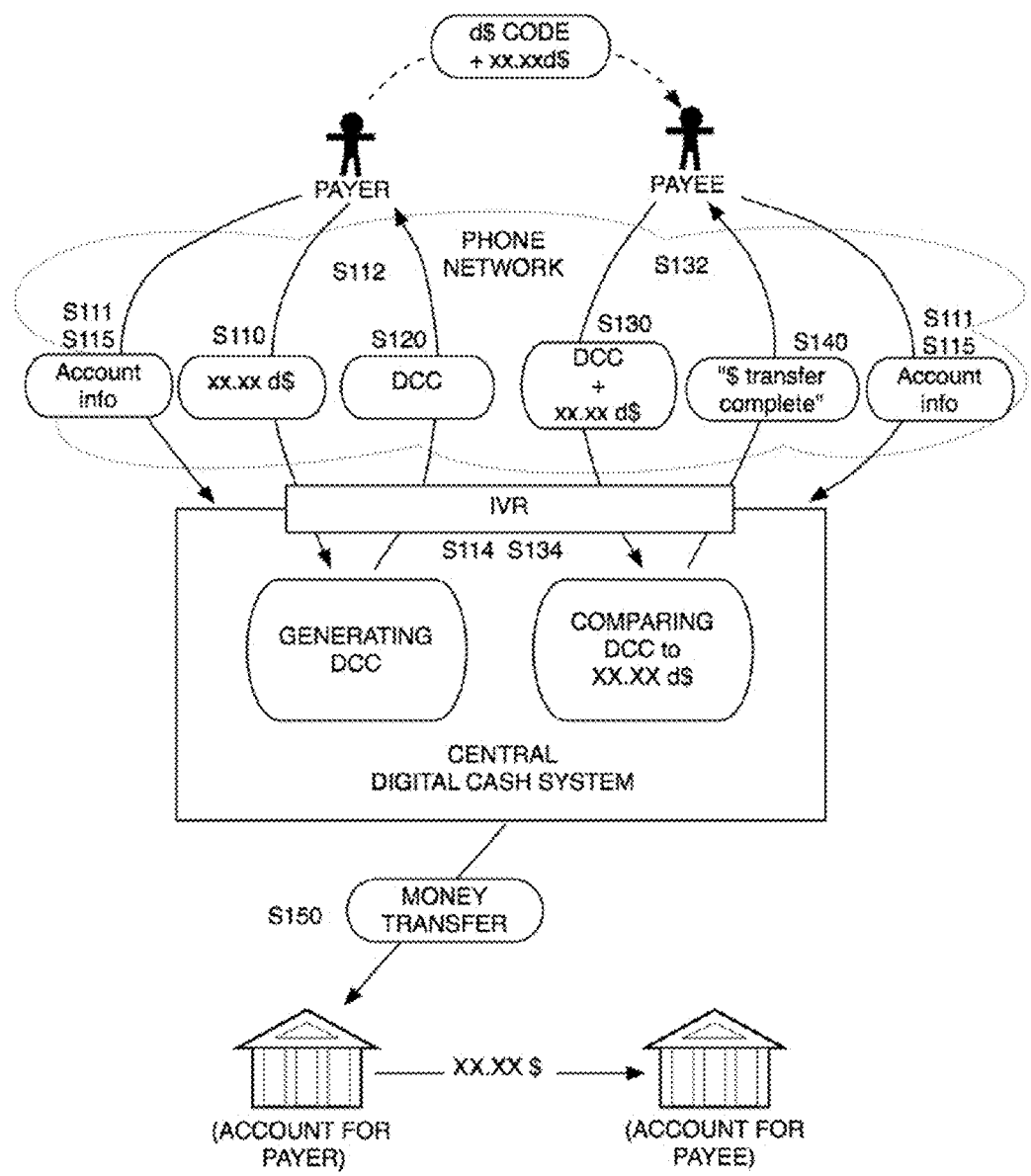
FIG. 1 is a flowchart representation of an embodiment of the method of the invention.

As shown in FIG. 1, the method of performing a digital-cash transaction includes receiving a digital-cash value requested to be withdrawn from an account of a payer S110, generating a digital-cash code that is connected with the requested digital-cash value S120, receiving the digital-cash value and the digital-cash code from a payee requesting to deposit the amount specified by the digital-cash value S130, comparing the received digital-cash value and the digital-cash code to confirm an association S140, and transferring funds of the amount specified by the digital-cash value to the payee S150. The method functions to provide secure codes that can be used like cash, but through a variety of channels like offline or online situations. The method is preferably implemented by a central digital cash system that processes the specific withdrawal or deposit requests of the payer and the payee and their respective financial accounts. A preferred embodiment is over a phone network, but the method may additionally be applied to any suitable technology such as by a website or software application connected to the internet or a TV platform (e.g., cable TV). The digital-cash code (DCC) and the digital-cash value (the amount of money the DCC represents) preferably acts as a pair of security devices. Neither the DCC nor the digital-cash value can preferably be used without the other to complete a transaction. Additionally, the method is preferably secure from identity theft since the method preferably removes the transfer of personal information during a transaction, unlike credit cards that require name, card number, billing address and unlike online payment methods that also require account information. In some alternative embodiments, particularly when used in situations where the value of the DCC is easily guessed, such as when used to pay for postage, other transaction related information may be used in place of a digital cash value. The method functions to allow digital cash to be managed similarly to how notes or coins are used for cash transactions: a payer selects the correct amount of money from purse or wallet, the cash is passed to the payee, and the payee then counts the money (i.e., verifies the money matches the agreed payment amount). The method functions to simulate a transaction and payment process that can operate outside of a banking system, where a user only needs the central digital cash system to withdraw and deposit money.

Step S110, which includes receiving a digital-cash value requested to be withdrawn from an account of a payer, functions to gather information of how much the payer requires for a digital-cash transaction (e.g., the amount to be paid). The payer preferably has an established account with funds that are available for use. Alternatively, the payer may create an account and add funds to an account (such as if the payer has a prepaid card that acts as a credit for digital-cash). In one variation, an account can be created during a call via a touch-tone phone. Step S110 preferably includes communicating between the payer and the central digital-cash system through a network S112 and interacting through an interface S114. The network and interface are preferably a telephone network and an Interactive Voice Response (WR) application that a payer interacts with using any suitable phone device. The network functions to connect the payer (and/or payee) to the central digital-cash system where processing of the digital-cash transaction occurs. The network could alternatively be any suitable communication channel such as the internet, over a TV provider, or even through traditional means such as a mail service or in person (such as at a bank). The interface functions as the interaction point between the central digital cash system and the payer or payee. The interface for the phone variation is preferably the WR application that allows the payer to enter information or speak user commands. The interface may alternatively be a graphical application, a text based interface (such as in SMS messages), object based (devices that represent digital-cash such as cards and device readers), point of sale (POS) terminal, or any suitable means of communicating the necessary information to the central digital-cash system. The interface is preferably a system that operates behind the network, directly connected to the central digital-cash system. However, the interface may alternatively operate in front of the network on the payer side of the network. The interface on the payer side of the network may function to allow for generating DCC's for digital-cash transactions without communicating with the central digital-cash system at the time of generating the DCC (and/or verifying DCC's and the digital-cash value they represent). In this variation, the method preferably includes the additional step of synchronizing a generated DCC with a central database on the central digital-cash system.

Step S110 may additionally include receiving an expiration time for the digital-cash code. The payer preferably is able to set an expiration time so that if the DCC is not used by the specified time then the DCC is voided and the funds return to the payer account. The expiration time may be a relative timer such as for one hour from the time of DCC generation, or may be an absolute time such as January 1 at 10:00 P.M. The expiration time may be based on the amount of the transaction, such as seven days for a larger transaction and twenty-one days for a smaller transaction. The expiration time may be based on the amount in the user account or any other appropriate parameter. The time limit may alternatively be automatically set by default.

Figure 4:
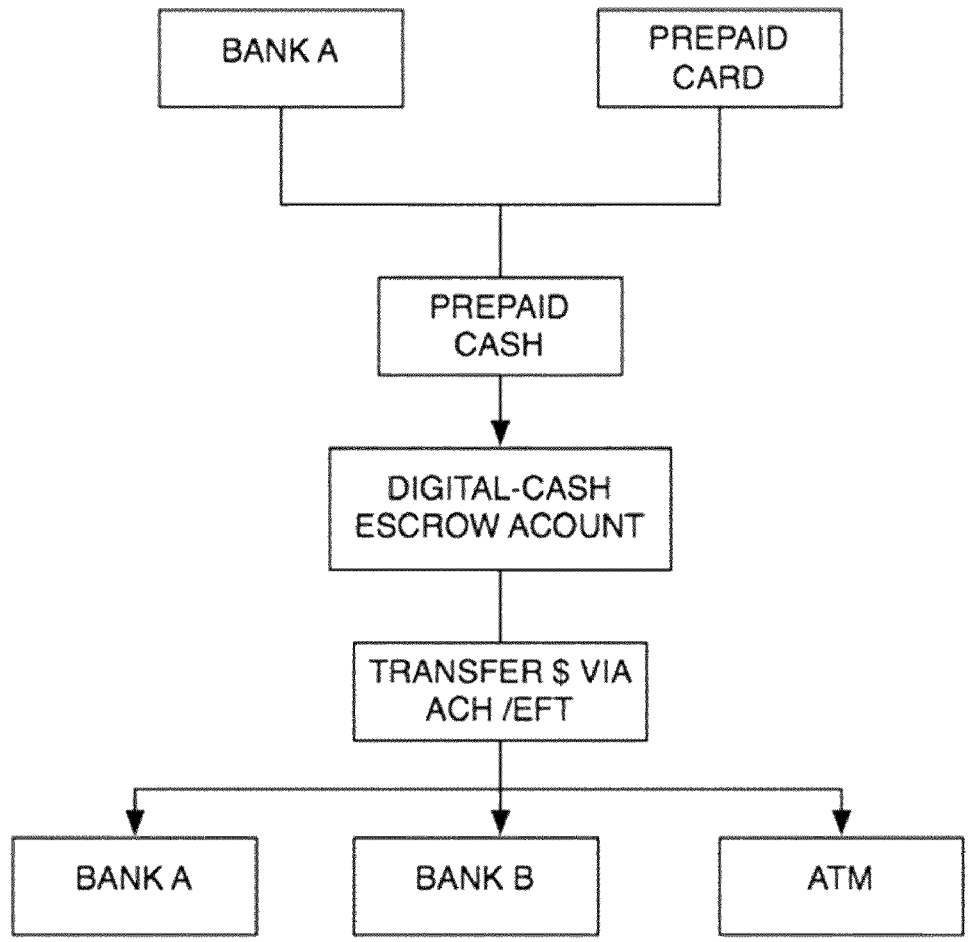
FIG. 4 is a schematic diagram of an embodiment of a digital-cash account.

Additionally, the method preferably includes the step of logging into an account S111. Step S111 functions to log a user (either the payer or payee) into an account that will take part in the transaction. The payer and the payee both preferably initiate the step of logging into an account, so that the central digital-cash system has an established account to withdraw funds from and/or an account to deposit funds into. The step may additionally or alternatively include creating a new account. The new account preferably is made instantly (i.e., at the time the payer or payee is interacting with the interface system), but may alternatively be created earlier, require approval, or include any suitable steps to creating an account. To create a new account, a payer or payee preferably enters a unique password/pin code (i.e., a privately known code). An account ID is created by the central digital cash system connected to the entered password/pin, and then transmitted to the payer or payee via voice, SMS, fax, email, or in any suitable way. The account ID is preferably a randomly generated account number ID and a previously non-existent, but may be any suitable account identification device. The account is preferably created with zero balance, but may alternatively be activated with a designated amount if for example the new account is created from a prepaid DCC card. To login to an account a user preferably provides a user account ID and a password/PIN S115. The user account ID is preferably numerical code, but could alternatively be an alphanumeric code a username, or any suitable identification device. The password is preferably a private identification number (PIN), but could be any suitable utterance, phrase, answer to security question, sequence of items, and/or any suitable item to verify that a person can access an account. In one variation, biometric verification may be used as an alternative or additional layer of security. The biometric verification preferably verifies the speech patterns and/or voiceprints of the user match that of the account owner. The biometric verification may alternatively be facial recognition, a finger/hand scan, eye scan, or any suitable form of biometric verification. The biometric verification may be used when entering a user account ID and/or a password. In yet another form of security, the caller ID or device ID may be used to as a layer of security for logging into an account. For example, a user may be required to call from a registered phone number to access an account. The account is preferably anonymous such that the account does not require personally identifiable information. This may have the extra benefit of preventing identity theft if account information has been compromised. Additionally, the anonymity of accounts may allow for quick creation of accounts by generating a user ID and obtaining a password from a user S115. This functions as a low barrier to use digital-cash even if an account has not been created or maintained. Additionally or alternatively, personal information may be gathered for the account such as legal name, address, security questions, or any information. The account may additionally be linked with a bank account, credit card, and/or any suitable monetary/payment account so that digital-cash may be moved to other financial systems. Transfers from a digital-cash account to other financial systems is preferably performed using an Automated Clearance House (ACH), Electronic Funds Transfer (EFT), or any method of money transfer as shown in FIG. 4.

Step S120, which includes generating a digital-cash code that is connected with the requested digital-cash value, functions to create a transferable object (physical or conceptual) to represent a designated amount of money. Preferably, the DCC is a numerical or alphanumerical string of values and may include the characters "*" and "#" or any suitable character. The DCC preferably has sixteen or fewer characters to make the DCC easily transcribed by a human. The DCC may alternatively be longer than sixteen characters, and for example, may even be a string with over 100 characters to conversely prevent the ease of human transcription. Different implementations of the DCC may be adapted to different capabilities for humans to manually perform a transaction. For example, some applications may lend themselves to human transcription of a DCC while another application may lend themselves to use with Optical Character Recognition (OCR) systems. Alternatively, the DCC may be any suitable representation of data. A Barcode or any visual graphic may be used to represent the DCC. Printers, screens, and/or scanners may preferably be necessary to implement a visual variation of a code, or barcodes (or other visual identifiers). An audio file may also be encoded with the necessary data. An audio file has the benefit of not easily being reproducible by nearby people, and can easily be played through a phone network. The DCC is preferably a random number, that is only associated with the cash value that the code represents. In one variation, the account from which the funds were originally withdrawn may not be encoded or associated with the DCC (in this scenario the money is preferably transferred to a holding account after the DCC is generated). The DCC may alternatively be a hash (or other function) of information. The DCC may alternatively be created by a human. The central digital-cash system preferably stores the relationship between the DDC and the cash value in a database. Additionally, the account for which the code was generated may be stored within the system. The DCC could additionally be a reusable code so that the user may memorize one number for digital-cash transactions. A reusable DCC is preferably assigned only one digital-cash value at a time so that the value may still serve as a security device. The DCC is preferably communicated (delivered) to the user by the interface. In the preferred embodiment an WR application announces the DCC to the payer. The central digital-cash system may alternatively send the DCC in a text message, in an email, fax, display on a webpage or within an application, may send it via traditional mail, or provide the DCC to the payer in any suitable manner. As a testament to the benefits of the preferred embodiment, the DCC can be delivered in a variety of ways without concern that the digital cash will be stolen—without the known value it represents, the DCC is not usable for completing a transaction. The funds from the payer account are preferably moved out of the account when the DCC is created, but may alternatively be moved after a payee completes a transaction.

Step S130, which includes receiving the digital-cash value and the digital-cash code from a payee requesting to deposit the amount specified by the digital-cash value, functions to receive the necessary information to confirm the transfer of a transaction and receive a payment. The payer preferably transfers the DCC to the payee. This may be done in any suitable manner such as in person, online, over the phone, in a message, through a third party, or any suitable form of communication. The payer and the payee presumably have agreed upon the value that needs to be transferred so they both share this information, but in the case where the payee is not aware of the digital-cash value (such as if a gift) the digital-cash value is also given to the payee by the payer. Step S130 also includes communicating between the payee and the central digital-cash system through a network S132 and interacting through an interface S134. Steps S132 and S134 are substantially similar to Steps S112 and S114 described above. However, the network and the interface between the payee and the central digital-cash system may be implemented by a different variation of the network and interface. For example, the payee may communicate using the phone network and an automated voice system, while the payer communicates using the internet and a website.

Step S140, which includes comparing the received digital-cash value and the digital-cash code to confirm an association, functions to process the provided information to confirm the payee has provided all the correct information to complete a transaction. Preferably, the central digital-cash system accesses a database where information associated with a DCC is stored. The associated value is preferably stored within this database. If the digital-cash provided by the payee value matches the stored associated value, then the DCC is confirmed. If they do not match, then a couple different suitable actions may be taken. For example, after three incorrect attempts the DCC may be voided and the digital-cash returned to the payer account if it had been preemptively withdrawn. Additionally or alternatively, the DCC may have a cryptographic code that is first decrypted and then used to find the proper associated value. In yet another variation, there may be a number of checksums that can be performed to verify the digital-cash value matches the DCC. For example, the DCC or a portion of the code may be a cryptographic hash of the digital-cash value, and after decrypting the hash, the result is compared to a number of verification codes to see if the DCC and the digital-cash value match. The verification codes may be updated periodically for security reasons. The interface can preferably perform this operation or alternatively the central digital-cash system can perform this operation. This variation may be used by an interface that operates on the payee side of the network so that a digital transaction can be accepted by a payee without an association to a network at the time of the payer-payee interaction. The interface preferably will update the information of the digital transaction afterwards and perform the final act of transferring funds (Step S150).

Step S150, which includes transferring funds of the amount specified by the digital-cash value to the payee, functions to withdraw funds from the payer account and deposit in the account of the payee. The funds are preferably transferred (e.g., withdrawn or prepaid) from the payer account at the time the DCC is generated. Alternatively, the funds may remain in the account but become unusable until the DCC has been used or voided. When a DCC has been confirmed, the funds from the payer account are preferably transferred to the payee account. The transfer may occur automatically once confirmed but may alternatively require payee verification or any suitable action to complete the transaction. Payer and Payee accounts (i.e., a digital-cash account) are preferably an escrow account as shown in FIG. 4 or any suitable account managed by the method operator. The escrow account preferably holds prepaid money that has been added through a prepaid card, deposited from a bank account or any suitable financial account or added in any suitable manner. The transfer between escrow accounts is preferably transferred internally or by any suitable system. The digital-cash account may alternatively be a bank account, credit card account, or any suitable financial account and the act of transferring preferably includes withdrawing and depositing from the payer and payee account. The transfer of money between outside accounts, such as between bank accounts, is preferably performed by an outside party, such as through an ACH or EFT. Alternatively, using DCC, cash may be withdrawn directly from an Automated Teller Machine (ATM) in place of transferring money to an account. In the case where the accounts are managed by the same institution or group, then this may be performed internally in any suitable way. If the accounts are managed or operated by different institutions then the fund transfer are preferably transferred by going through an ACH, but could be achieved in any suitable manner. The DCC is preferably made invalid upon confirmation of a DCC deposit.

In an alternative embodiment, a DCC may be associated with information (a secondary piece of information) other than the digital-cash value. This alternative functions to open up DCC usage to applications where the price can easily be guessed. This information may be any suitable piece of information but is preferably specific for the application. For example, a DCC used in paid parking lots may be associated with a license plate number, postage stamps may be associated with the sender and/or receiver address (e.g., the zip codes), and performance tickets may be associated with seat numbers or ticket holder names. The alternative information is preferably stored and managed in substantially the same way as the digital-cash value. The DCC and the associated information are stored in a similar database, and the payee must supply both the DCC and the associated information to confirm the DCC.

Figure 2:
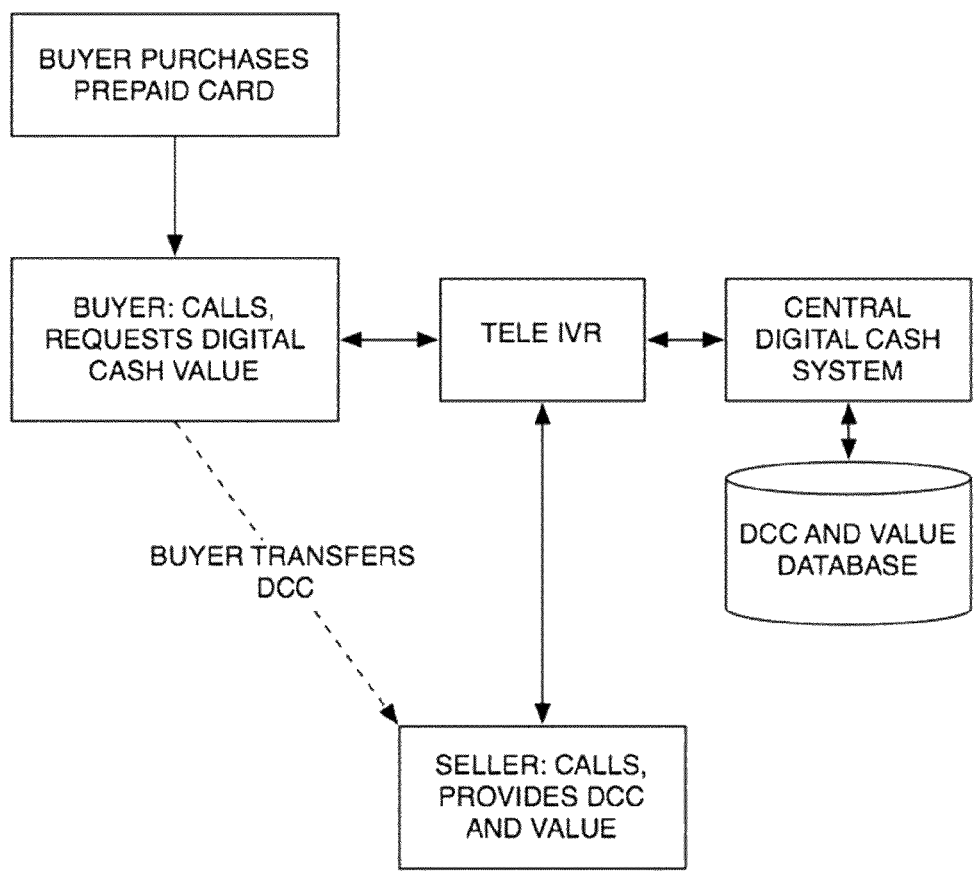
FIG. 2 is an exemplary flowchart of another embodiment using a prepaid card.

In one example, as shown in FIG. 2, the preferred method of performing a digital-cash can be applied to prepaid cards. A prepaid card is preferably purchased by a payer, but could be purchased by a third party and provided as a gift or payment. The card has an associated account number and may have a PIN number or password (such as revealed by scratching away a protective layer). The card (and/or account) is preferably activated at the point of sale, but may be alternatively activated online or over the phone. The card purchaser preferably calls a provided phone number to the central digital cash system, entering the provided account number and password. The amount of money that the card was purchased for (or that the card represented) is automatically in the account. The payer then may request to pay a certain amount of money (e.g., pay $10) from the account. An WR application reads a generated DCC to the card holder. The payer is then free to give the DCC to anyone to pay $10. The payer then shows, reads, or communicates in some form the DCC to a person they wish to pay (i.e., the payee). Once in possession of the DCC, the payee calls the phone number and enters the DCC and the value ($10). Since the DCC matches the value, the DCC is confirmed and $10 will be transferred to the payees account. If someone had acquired the DCC without the card holders permission, that person would not be able to use the DCC because the value the DCC represents would not be known.

Figure 3:
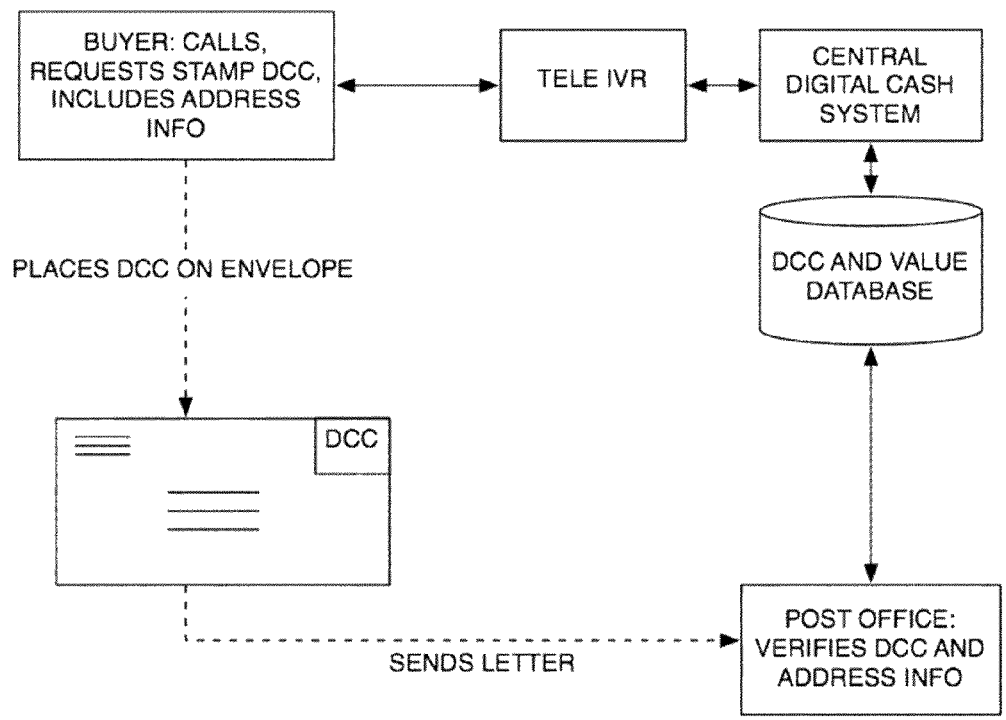
FIG. 3 is an exemplary flowchart of another embodiment applied to postage stamps.

In another example, as shown in FIG. 3, the preferred method of performing a digital-cash can additionally be applied to paying for postage. A payer acquires a DCC for the price of postage. The sender address or the receiver address may be required during this portion. A payer (i.e., sender) preferably writes or places a DCC on an envelope in place of a stamp. The letter can then be mailed. The postal service preferably uses OCR or other means, and then communicates with the central digital cash system to confirm the DCC. As the price of postage is easily guessed, address information is preferably used as a security measure. 'To' and/or 'From' zip codes or sender or receiver information such as street address or name may be encoded in the DCC or used in place of the digital-cash value when confirming the DCC.

As a person skilled in the art will recognize from the previous detailed description and from the figures and claims, modifications and changes can be made to the preferred embodiments of the invention without departing from the scope of this invention defined in the following claims.

I claim:

1. A method for performing a digital monetary transaction between a payer and a payee, the method comprising:
connecting a central digital-cash system over a network;
receiving a digital-cash value requested to be withdrawn from an account of a payer;
generating a digital-cash code that is associated with the requested digital-cash value and communicating the digital-cash code to the payer;
receiving the digital-cash value and the digital-cash code from a payee requesting to deposit the amount specified by the digital-cash value;
comparing the received digital-cash value and the digital-cash code to confirm an association; and
transferring funds of the amount specified by the digital-cash value to the payee, the central digital-cash system processing the digital-cash transaction and interacting with the payer and the payee through an interface,
wherein the step of comparing includes:
    calculating a checksum with the digital-cash value and the digital-cash code;
    confirming to the payee the transaction is valid without being connected to the central digital-cash system; and
    transferring funds of the amount specified by the digital-cash value to the payee upon establishing a network connection to the central digital-cash system.

* * * * *